United States Patent
Kojima et al.

(10) Patent No.: US 12,359,607 B2
(45) Date of Patent: Jul. 15, 2025

(54) GAS-LIQUID SEPARATION MECHANISM OF RESERVE TANK

(71) Applicant: SUBARU CORPORATION, Tokyo (JP)

(72) Inventors: Momoka Kojima, Tokyo (JP); Keita Gomi, Tokyo (JP); Youhei Hashimoto, Tokyo (JP); Takuji Yoshikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 216 days.

(21) Appl. No.: 18/343,429

(22) Filed: Jun. 28, 2023

(65) Prior Publication Data
US 2024/0018896 A1 Jan. 18, 2024

(30) Foreign Application Priority Data
Jul. 12, 2022 (JP) .................. 2022-111584

(51) Int. Cl.
*F01P 11/02* (2006.01)
*B01D 19/00* (2006.01)

(52) U.S. Cl.
CPC ........ *F01P 11/029* (2013.01); *B01D 19/0057* (2013.01); *F01P 11/028* (2013.01)

(58) Field of Classification Search
CPC ... F01P 11/029; F01P 11/028; B01D 19/0057; B01D 45/08
USPC .................................... 165/104.32
See application file for complete search history.

(56) References Cited

U.S. PATENT DOCUMENTS

| | | | | |
|---|---|---|---|---|
| 5,494,586 | A * | 2/1996 | Inoue | B01D 17/06 210/243 |
| 11,167,229 | B2 * | 11/2021 | Mishima | B01D 35/0273 |
| 11,577,188 | B2 * | 2/2023 | Mishima | B01D 45/10 |
| 2019/0282942 | A1 * | 9/2019 | Mishima | B01D 36/001 |
| 2020/0324232 | A1 * | 10/2020 | Mishima | B01D 45/08 |
| 2022/0226753 | A1 * | 7/2022 | Okuno | B01D 19/0057 |
| 2025/0032964 | A1 * | 1/2025 | Okuno | B01D 45/08 |

FOREIGN PATENT DOCUMENTS

| | | |
|---|---|---|
| JP | 2005-120906 A | 5/2005 |
| JP | 2017-166347 A | 9/2017 |

* cited by examiner

*Primary Examiner* — Jon T. Schermerhorn, Jr.
(74) *Attorney, Agent, or Firm* — Smith, Gambrell & Russell, LLP

(57) ABSTRACT

A gas-liquid separation mechanism of a reserve tank for separating gas bubbles in a coolant flowing into a reserve tank provided upstream of a liquid pump in a circulation path of the coolant includes: an inlet opening for the coolant provided at a lower portion of one of opposing side walls; an outlet opening for the coolant provided at a lower portion of the other side wall; a bubble emission port provided on an upper wall and configured to emit the gas bubbles separated from the coolant; and a partition wall extending substantially parallel to a direction from the inlet opening to the outlet opening and vertically dividing the reserve tank into first and second chambers. The partition wall includes a downstream communicating hole below an end portion proximate to the outlet opening and an upstream communicating and an upstream communicating hole above an end portion proximate to the inlet opening.

9 Claims, 9 Drawing Sheets

GAS-LIQUID SEPARATION MECHANISM OF RESERVE TANK

CROSS-REFERENCE TO RELATED APPLICATIONS

The present application claims priority from Japanese Patent Application No. 2022-111584 filed on Jul. 12, 2022, the entire contents of which are hereby incorporated by reference.

BACKGROUND

The disclosure relates to a gas-liquid separation mechanism of a reserve tank provided in a circulation path of a coolant.

For example, a vehicle is provided with a cooling system that cools heat generating equipment such as an engine and a power conversion device by circulating a coolant. In this cooling system, the coolant circulates through the circulation path constituting a closed loop so that the heat generating equipment is cooled. The coolant that has been used to cool the heat generating equipment and has reached a high temperature is cooled by, for example, heat exchange with outside air in a heat exchanger such as a radiator. The coolant that has reached a low temperature by this cooling is used to cool the heat generating equipment again. Such an action is continuously repeated, and thus the heat generating equipment is cooled, and its temperature is kept a certain value or lower.

A reserve tank for storing the coolant is provided upstream of a liquid pump in the circulation path of the coolant. The reserve tank serves to replenish the cooling circuit with the coolant and to absorb a volume change of the coolant due to thermal expansion. The reserve tank is provided with a gas-liquid separation mechanism for separating and removing bubbles contained in the coolant. Before the coolant is suctioned into the liquid pump, the gas-liquid separation mechanism separates and removes the bubbles contained in the coolant from the coolant, so that suction of the bubbles by the liquid pump is suppressed, and an occurrence of a malfunction of the liquid pump due to the suction of the bubbles is suppressed.

As a reserve tank provided with the gas-liquid separation mechanism, for example, Japanese Unexamined Patent Application Publication (JP-A) No. 2005-120906 proposes a reserve tank including a gas-liquid separation structure in which partition walls perpendicular to a flow of the coolant are provided inside the reserve tank, and a through hole is formed in each partition wall. This reserve tank is provided with a wing piece that has a rectangular shape and is bent in an arc shape as a vortex generation suppressing member on a rear side as viewed along a flow direction of the coolant adjacent to the through hole of each partition wall. The wing piece suppresses generation of a vortex in the flow of the coolant after passing through the through hole. The wing piece has the same height as a height of the partition wall and is provided in a shape gradually expanding on both sides of the through hole so as to sandwich the through hole. According to this reserve tank, generation of a vortex at a rear surface of the partition wall with the through hole in the tank can be suppressed, and the gas-liquid separation action can be improved.

Japanese Unexamined Patent Application Publication (JP-A) No. 2017-166347 proposes a reserve tank in which the tank main body includes internal partition walls perpendicular to the flow direction of the coolant and is provided with a first tank outlet and a second tank outlet. The second tank outlet of the reserve tank is disposed such that a path length of a second flow path is shorter than a path length of a first flow path passing through the internal partition walls. Thus, a liquid amount of the coolant flowing through the first flow path having the longer path length is suppressed, and waves of a liquid surface in the tank main body is reduced accordingly. As a result, even when a circulation flow rate of the coolant increases in the cooling system, entrainment of air into the coolant in the tank main body can be suppressed.

SUMMARY

An aspect of the disclosure provides a gas-liquid separation mechanism. The gas-liquid separation mechanism is configured to separate gas bubbles contained in a coolant flowing into a reserve tank provided upstream of a liquid pump in a circulation path of the coolant. The reserve tank includes an inlet opening for the coolant, an outlet opening for the coolant, a bubble emission port, and a partition wall. The inlet opening is provided at a lower portion of one of side walls opposing each other. The outlet opening is provided at a lower portion of the other of the side walls. The bubble emission port is provided on an upper wall and configured to emit the gas bubbles separated from the coolant. The partition wall extends substantially parallel to a direction from the inlet opening to the outlet opening and vertically divides the reserve tank into a first chamber and a second chamber. The inlet opening and the outlet opening are provided in the first chamber. The bubble emission port is provided at least in the first chamber. The partition wall includes a downstream communicating hole and an upstream communicating hole. The downstream communicating hole is provided below a first end portion of the partition wall. The first end portion is proximate to the outlet opening. The upstream communicating hole is provided above a second end portion of the partition wall. The second end portion is proximate to the inlet opening.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In the reserve tank proposed in JP-A No. 2005-120906, the partition walls perpendicular to the flow of the coolant and the wing pieces for guiding the coolant to the partition walls are formed, so that more complicated manufacturing processes and more complicated structures may increase manufacturing costs.

In the reserve tank proposed in JP-A No. 2017-166347, the partition walls perpendicular to the flow of the coolant are formed, so that more complicated manufacturing processes and more complicated structures may increase manufacturing costs.

It is desirable to provide a gas-liquid separation mechanism of a reserve tank that can efficiently separate bubbles contained in a coolant and collect the bubbles, with a simple configuration.

Figure 7:
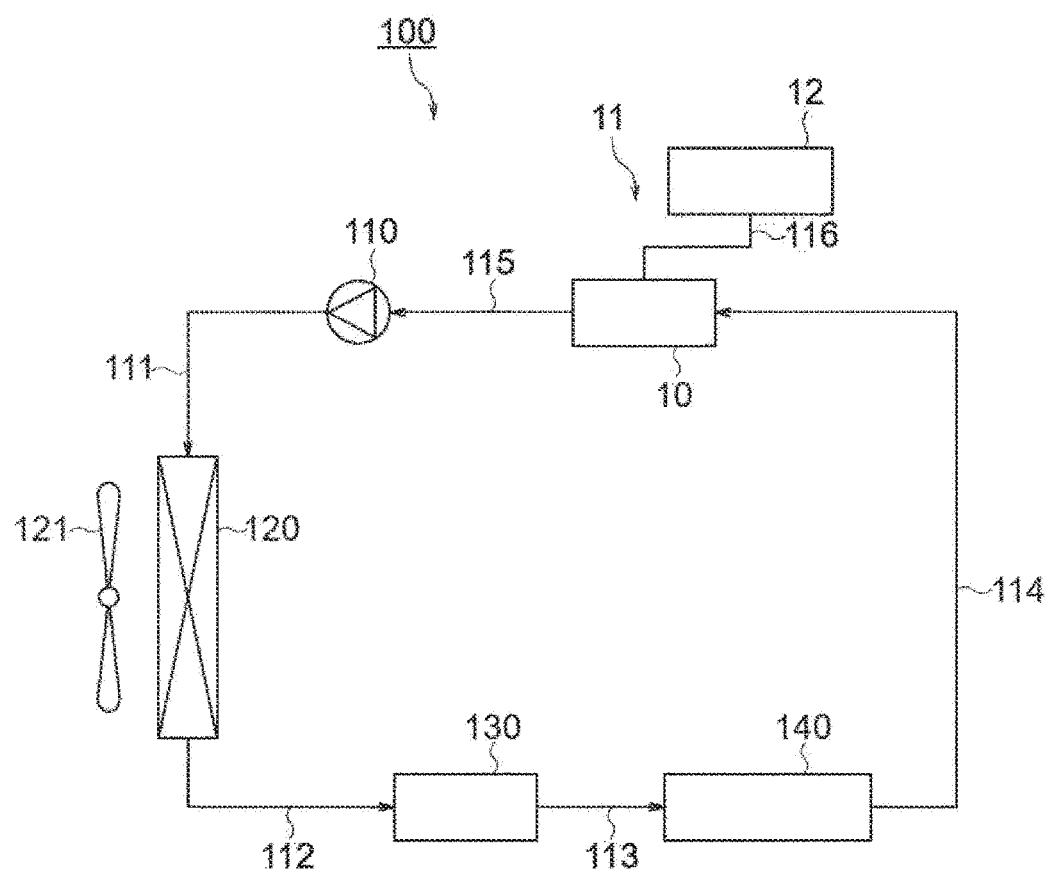
FIG. 7 is a block diagram illustrating a configuration of a cooling system provided in a vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 7 is a block diagram illustrating a cooling system as an example to which the gas-liquid separation mechanism according to an embodiment of the disclosure is to be applied and illustrating a circulation path of the coolant in a case taken as an example where the cooling system is provided in a vehicle. In a cooling system 100 illustrated in the drawing, the coolant circulates through the circulation path constituting a closed loop. This circulation of the coolant cools a power conversion device 130 and an oil cooler 140 that are serving as heat generating equipment and keeps their temperatures to a certain value or lower. The power conversion device 130 includes an inverter (INV), a DC-DC converter, and an on-board charger (OBC). A liquid (antifreeze liquid) containing ethylene glycol, which has high thermal conductivity and is not easily frozen, or the like as a main component is used as the coolant.

A liquid pump 110 for circulating the coolant is provided in the circulation path. A radiator 120, the power conversion device 130, the oil cooler 140, and a sub tank 10 of a reserve tank 11 are sequentially disposed along the flow direction of the coolant discharged from the liquid pump 110. A pipe 111 extending from a discharge side of the liquid pump 110 is coupled to an inlet side of the radiator 120. A pipe 112 extending from an outlet side of the radiator 120 is coupled to an inlet side of the power conversion device 130. A pipe 113 extending from an outlet side of the power conversion device 130 is coupled to an inlet side of the oil cooler 140. A pipe 114 extending from an outlet side of the oil cooler 140 is coupled to an inlet side of the sub tank 10. A pipe 115 extending from an outlet side of the sub tank 10 is coupled to a suction side of the liquid pump 110. The radiator 120 is provided with an electric radiator fan 121 for causing the outside air to pass through the radiator 120 to promote heat exchange between the coolant and the outside air.

In the present application example, the reserve tank 11 is divided into a main tank 12 and the sub tank 10, and the gas-liquid separation mechanism according to the disclosure is provided in the sub tank 10. The sub tank 10 is provided in the circulation path as described above, and the main tank 12 is disposed above the sub tank 10. The main tank 12 and the sub tank 10 communicate with each other through a communicating pipe 116.

In the application example described above, the power conversion device 130 and the oil cooler 140 are exemplified as the heat generating equipment that is cooling target, but the cooling target may include an engine, and other auxiliary devices.

Next, configurations of the sub tank 10 and the gas-liquid separation mechanism according to the embodiment of the disclosure provided in the sub tank 10 will be described in detail with reference to FIGS. 1 to 4.

Figure 1:
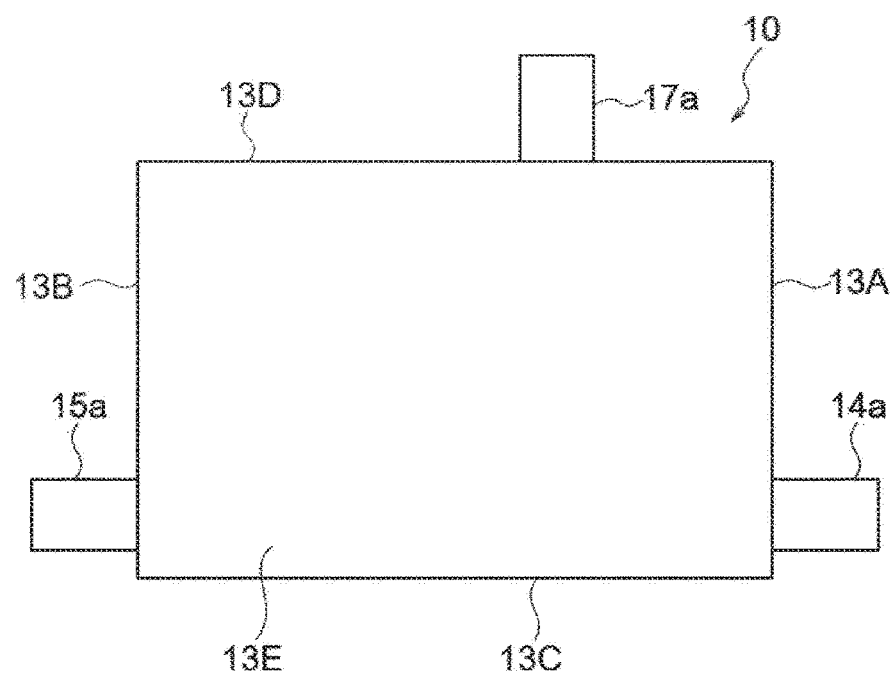
FIG. 1 is an exterior front view of a reserve tank (sub tank) including a gas-liquid separation mechanism according to an embodiment of the disclosure.
Figure 2A:
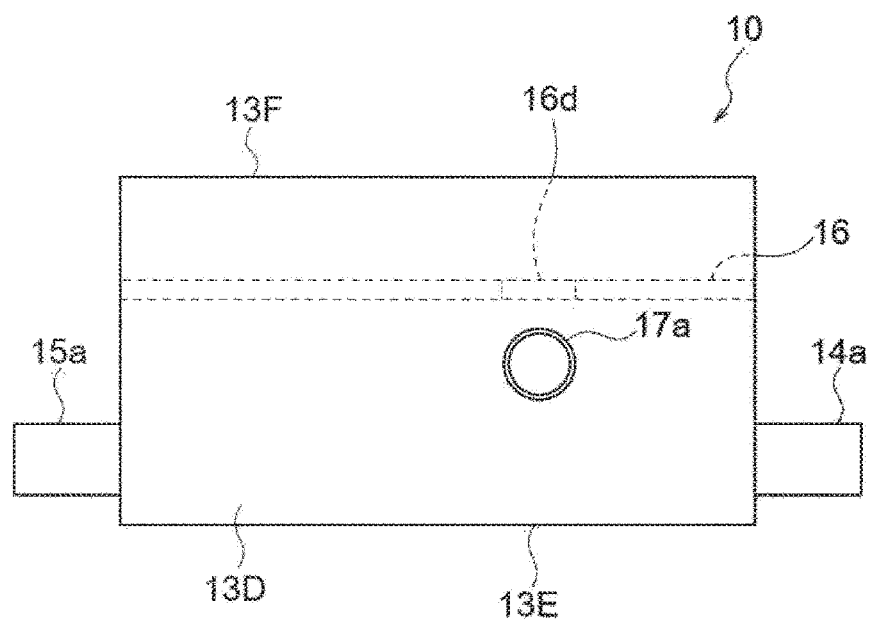
FIG. 2A is a top view of the reserve tank (sub tank) illustrating a configuration of the gas-liquid separation mechanism according to an embodiment of the disclosure.
Figure 2B:
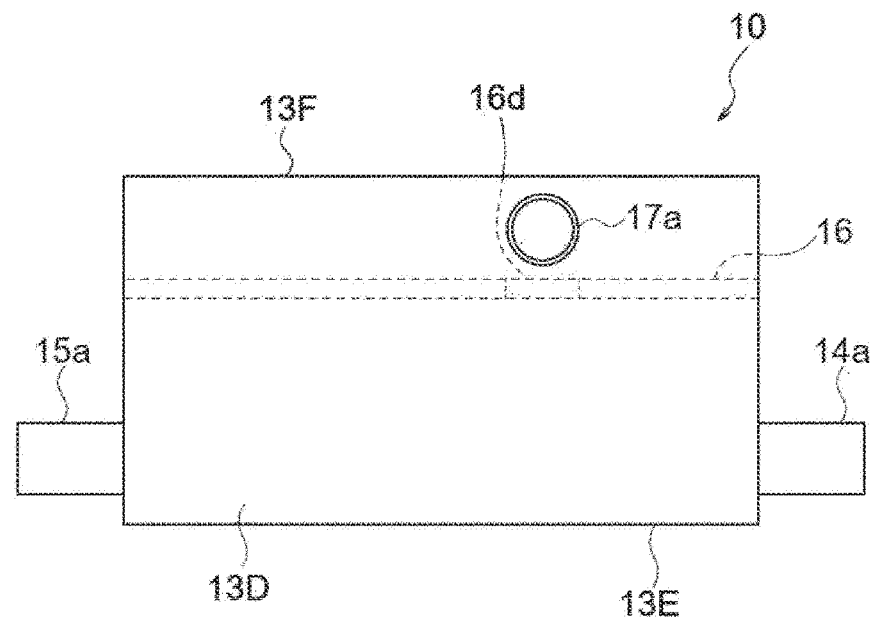
FIG. 2B is a top view of the reserve tank (sub tank) illustrating a configuration of the gas-liquid separation mechanism according to a modification of the embodiment.
Figure 2C:
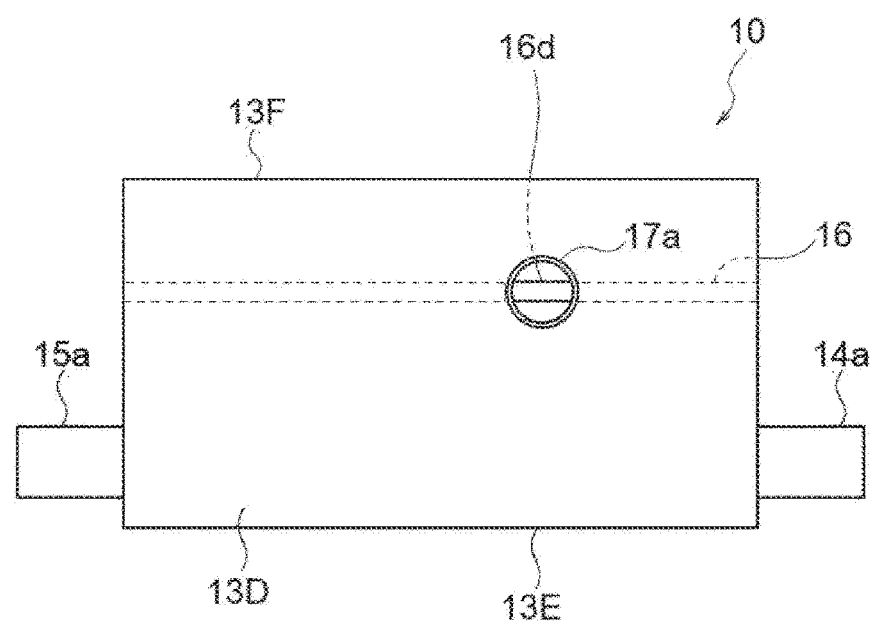
FIG. 2C is a top view of the reserve tank (sub tank) illustrating a configuration of the gas-liquid separation mechanism according to a modification of the embodiment.
Figure 3:
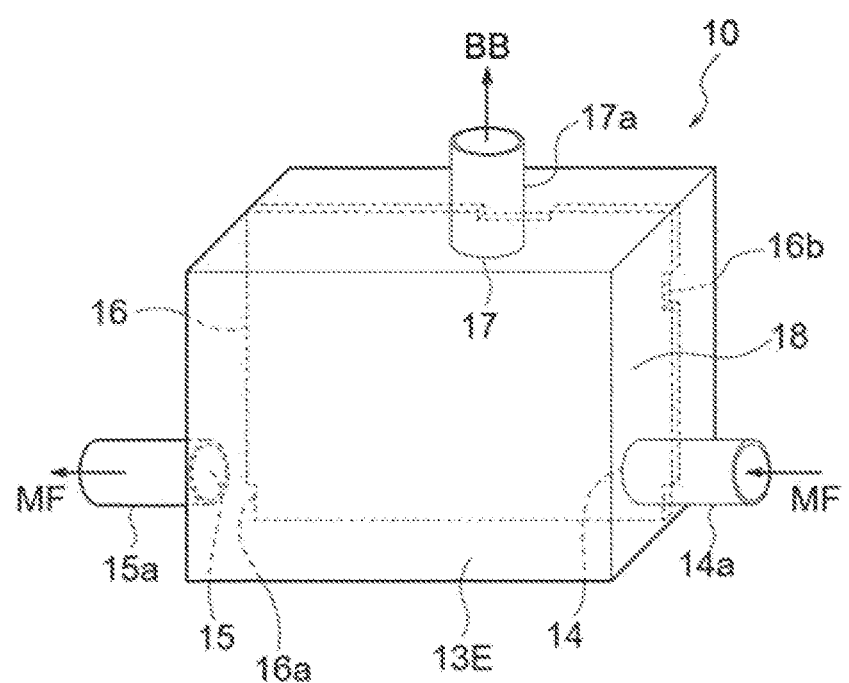
FIG. 3 is a front perspective view of the reserve tank (sub tank) illustrating a configuration of the gas-liquid separation mechanism according to an embodiment of the disclosure.

FIG. 1 illustrates a front view configuration of the sub tank 10 including the gas-liquid separation mechanism according to one embodiment of the disclosure. Each of FIGS. 2A to 2C illustrates a top view configuration of the sub tank 10 including the gas-liquid separation mechanism according to one embodiment of the disclosure. FIG. 3 illustrates a front perspective configuration of the sub tank 10 including the gas-liquid separation mechanism according to one embodiment of the disclosure.

The sub tank 10 has a substantially rectangular box shape. An inlet opening 14 having a circular shape into which the coolant flows is provided in a lower portion of a side wall 13A. An outlet opening 15 having a circular shape through which the coolant flows out is provided in a lower portion of a side wall 13B opposing to the side wall 13A. The side walls 13A and 13B are coupled to each other by two side walls 13E and 13F perpendicular to the side walls 13A and 13B. Further, a bottom wall 13C and an upper wall 13D are provided, so that the sub tank 10 is sealed as a tank having a rectangular shape.

A partition wall 16 substantially dividing the sub tank 10 into two along the flow direction of the coolant is provided. The partition wall 16 divides the sub tank 10 into a first chamber 18 and a second chamber 19.

A coupling portion of a nipple 14a constituting an inlet flow path to the side wall 13A on the upstream side of the sub tank 10 is configured as the inlet opening 14 having the circular shape, and a nipple 15a constituting an outlet flow path is opened as the outlet opening 15 having the circular shape at a lower portion of the side wall 13B on the downstream side of the sub tank 10. Accordingly, the inlet opening 14 and the outlet opening 15 are opened to face each other in the flow direction of the coolant and are each provided in the first chamber 18. Thus, a main flow of the coolant flows into the first chamber 18 from the inlet opening 14 and flows out of the first chamber 18 through the outlet opening 15. The nipples 14a and 15a having a circular pipe shape constituting the inlet flow path and the outlet flow path are horizontally coupled to the inlet opening 14 and the outlet opening 15, respectively. Pipes 114 and 115 illustrated in FIG. 7 are coupled to the nipples 14a and 15a, respectively.

Further, a nipple 17a having a circular pipe shape is vertically coupled to the top of the first chamber 18 at a position closer to the upstream side (closer to the right in FIG. 3 and closer to the left in FIG. 4) of the center in the width direction of the upper wall 13D of the sub tank 10 (see FIG. 2A). One end in the longitudinal direction of the communicating pipe 116 illustrated in FIG. 7 is coupled to the nipple 17a. The nipple 17a is opened at the upper wall 13D of the sub tank 10 as a bubble emission port 17 having a circular shape for emitting bubbles separated from the coolant. Hereinafter, the bubbles are gas bubbles. An upper communicating hole 16d is provided so as to correspond to the bubble emission port 17, at a position which is an upper end of the partition wall 16 and where the bubble emission port 17 and the upper communicating hole 16d are substantially the same in distances from both side walls of the reserve tank. The nipple 17a may be provided at the top of the second chamber 19 as illustrated in FIG. 2B, may be provided across the first chamber 18 and the second chamber 19 as illustrated in FIG. 2C, or may be provided at each of the top of the first chamber 18 and the top of the second chamber 19.

In the sub tank 10 configured as described above, the gas-liquid separation mechanism according to the disclosure includes the above-described partition wall 16 and a downstream communicating hole 16a, upstream communicating holes 16b and 16c, and the upper communicating hole 16d, which are provided in the partition wall 16. Although illustration and detailed description of the configuration of the main tank 12 are omitted, an opening for replenishing the coolant is opened at an upper end of the main tank 12, and the opening is closed by a cap. The cap is provided with a valve (relief valve), and as will be described below, bubbles BB separated from the coolant by the gas-liquid separation mechanism provided in the sub tank 10 are introduced into the main tank 12 through the communicating pipe 116 by buoyancy. Then, when an internal pressure of the main tank 12 exceeds a predetermined value, the valve is opened to emit air in the main tank 12 to the atmosphere.

Next, an action of the gas-liquid separation mechanism according to the disclosure will be described below with reference to FIGS. 3 to 5.

FIG. 3 is a front perspective view of the sub tank 10 illustrating an action of the gas-liquid separation mechanism according to the disclosure. As described above, the coolant that has been used to cool the power conversion device 130 and the oil cooler 140, which are the heat generating equipment, horizontally flows into the first chamber 18 as a main flow MF from the inlet opening 14 of the nipple 14a on the upstream side to the lower space in the sub tank 10 as illustrated in FIG. 3. Then, in the main flow MF of the coolant having horizontally flowed into the lower space of the first chamber 18, a part of the main flow MF is guided to the second chamber 19 corresponding to a back side of the partition wall 16 by the downstream communicating hole 16a in a process of flowing toward the outlet opening 15 on the downstream side. Most of the coolant other than the part of the main flow MF is suctioned from the outlet opening 15 to the suction side of the liquid pump 110 through the pipe 115 illustrated in FIG. 7 via the nipple 15a on the downstream side.

The first chamber 18 has a volume of ½ or more of the sub tank 10, and a wide space is secured above the inlet opening 14 of the nipple 14a on the upstream side and the outlet opening 15 of the nipple 15a on the downstream side. Thus, while the flow rate of the main flow MF of the coolant flowing into the first chamber is sufficiently secured, a temporal margin and a spatial margin are present for effectively separating relatively large bubbles from the main flow MF until the main flow MF flows out to the outlet opening 15, and the bubbles in the first chamber stay in the upper space of the first chamber 18 for a short time. Then, a part of the bubbles flows into the main tank 12 illustrated in FIG. 7 from the bubble emission port 17 through the nipple 17a and the communicating pipe 116 illustrated in FIG. 7 by buoyancy and is collected.

Figure 4:
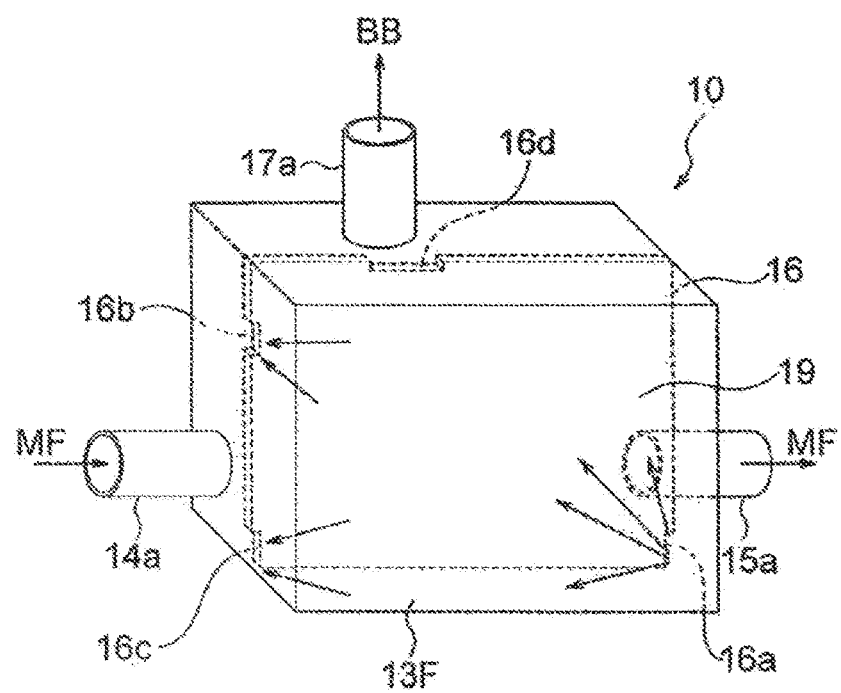
FIG. 4 is a rear perspective view conceptually illustrating inflow and outflow of a coolant in a second chamber of the reserve tank (sub tank) illustrating a configuration of the gas-liquid separation mechanism according to an embodiment of the disclosure.

FIG. 4 is a rear perspective view illustrating an action of the gas-liquid separation mechanism according to the disclosure and conceptually illustrating inflow and outflow of the coolant in the second chamber. The second chamber 19 is illustrated in front in FIG. 4. The second chamber 19 has a volume of less than ½ of the sub tank 10, and thus the second chamber 19 is smaller than the first chamber 18 in volume. As described above, a part of the coolant flowing into the first chamber 18 as the main flow MF is introduced into the second chamber 19 through the downstream communicating hole 16a of the partition wall 16. The sub flow of the coolant having been introduced into the second chamber 19 from the downstream communicating hole 16a flows from the lower space of the second chamber 19 and flows toward the upstream communicating holes 16b and 16c, thus generating a substantially upward flow in the second chamber.

Figure 5:
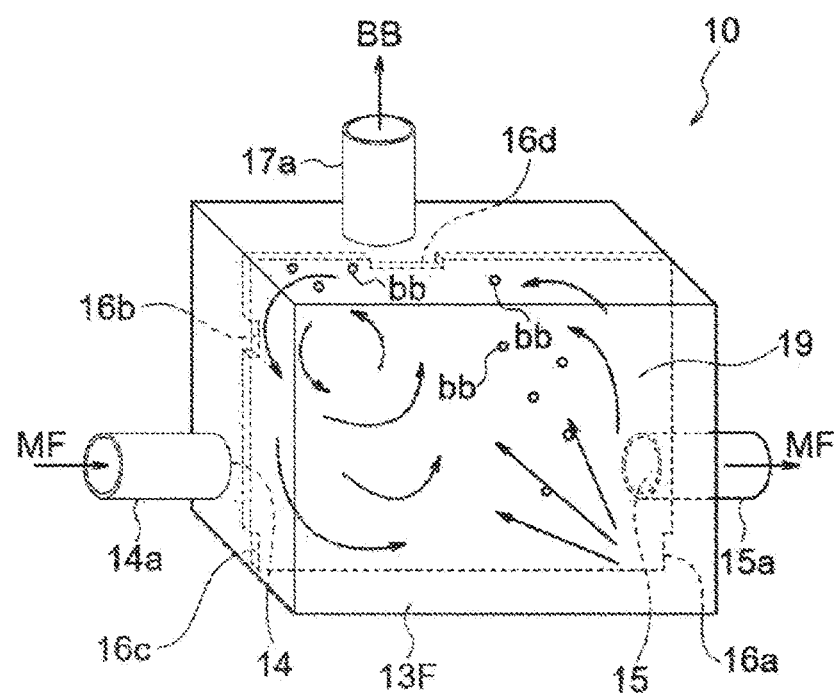
FIG. 5 is a rear perspective view conceptually illustrating movement of bubbles in the second chamber of the reserve tank (sub tank) illustrating the configuration of the gas-liquid separation mechanism according to an embodiment of the disclosure.

FIG. 5 is a rear perspective view illustrating the action of the gas-liquid separation mechanism according to the disclosure and conceptually illustrating a movement of the bubbles in the second chamber. An upward flow of the sub flow of the coolant introduced into the second chamber 19 from the downstream communicating hole 16a serves to raise relatively small bubbles bb contained in the coolant. The upward flow collides with the side walls 13A and 13B, the upper wall 13D, and the bottom wall 13C of the sub tank 10 to generate a vortex of vertical rotation of the coolant. With the action of the vortex of the vertical rotation, the relatively small bubbles bb contained in the coolant stay in the upper space of the second chamber. According to this configuration, the sub flow of the coolant having flowed into the lower space of the second chamber 19 is divided into two flows to flow toward upper and lower upstream communicating holes 16b and 16c. The upper upstream communicating hole 16b serves to guide the sub flow of the coolant from the downstream communicating hole 16a upward. The lower upstream communicating hole 16c serves to cause only the coolant to flow out to the first chamber 18 without allowing the bubbles bb to flow out again to the first chamber 18. The total area of the upper and lower upstream communicating holes 16b and 16c is larger than the area of the downstream communicating hole 16a. The product of area of hole and the flow velocity is constant, and thus the larger the area of the communicating hole is, the lower the flow velocity is. Hence, the velocity of the flow toward each upstream communicating hole is low. With this action, the separation of the bubbles bb contained in the coolant (sub flow) flowing into the sub tank 10 from the coolant is further promoted.

According to the above-described configuration, the flow velocity of the coolant flowing out (returning) from the second chamber 19 to the first chamber 18 via each of the upstream communicating holes 16b and 16c is relatively lower than the flow velocity of the sub flow of the coolant introduced from the downstream communicating hole 16a.

Thus, the bubbles bb in the second chamber 19 is suppressed from being drawn back to the first chamber 18 to flow out of the sub tank 10.

Furthermore, the upper communicating hole 16d is provided on a slightly upstream side of a portion of the partition wall 16 in contact with the upper wall 13D of the sub tank 10. The bubbles rising in the first chamber 18 and staying at or near the upper wall are allowed to move to a chamber space of the second chamber 19 through the upper communicating hole 16d. The bubbles rising in the second chamber 19 and staying at or near the upper wall are allowed to move to a chamber space of the first chamber 18 through the upper communicating hole 16d. In one example, the velocity of the sub flow is reduced due to the upstream communicating hole 16b on the upper side, so that the velocity of the flow of the bubbles bb passing through the upper communicating hole 16d can be sufficiently reduced. Thus, even when the bubble emission port 17 is provided only in the first chamber 18, the bubbles bb accumulated in the second chamber 19 move to the first chamber 18 through the upper communicating hole 16d. Then, the bubbles BB in the first and second chambers are efficiently emitted from the bubble emission port 17 by buoyancy and flow into the main tank 12 illustrated in FIG. 7 through the nipple 17a and the communicating pipe 116 illustrated in FIG. 7 to be collected. When the bubble emission port 17 is provided on the first chamber 18 side and the upper communicating hole 16d is not provided, the bubbles bb staying in the upper space of the second chamber move through the upstream communicating hole 16b to the first chamber side over time and are emitted from the bubble emission port 17. When the bubble emission port 17 is provided across upper portions of the first chamber and the second chamber, the bubbles can be emitted from the bubble emission port 17 even when the upper communicating hole 16d is omitted (see FIG. 2C). Alternatively, when the bubble emission port is additionally provided on the second chamber side, the bubbles bb are also emitted from above the second chamber. When the internal pressure of the main tank 12 exceeds a predetermined value as a result of the collection of the bubbles BB in the main tank 12, the valve (relief valve) provided in the cap (not illustrated) of the main tank 12 is opened to emit air into the atmosphere as described above.

With the above action repeated, the separation of the bubbles contained in the coolant flowing into the sub tank 10 as the main flow MF from the coolant is promoted, and the bubbles BB separated from the coolant are collected in the main tank 12. As a result, the bubbles are suppressed from being contained in the coolant flowing out from the sub tank 10 to the pipe 115 illustrated in FIG. 7 and suctioned into the liquid pump 110. Thus, the occurrence of the malfunction of the liquid pump 110 due to air suction is suppressed, and stable operation of the liquid pump 110 is ensured.

As described above, the gas-liquid separation mechanism for separating the bubbles contained in the coolant from the coolant has a simple structure in which the bubble emission port 17 is provided at the upper wall 13D of the sub tank 10, and the partition wall 16 including the downstream communicating hole 16a, the two upstream communicating holes 16b and 16c, and the upper communicating hole 16d is provided substantially parallel to the flow direction of the main flow MF of the coolant. Thus, the structure of the gas-liquid separation mechanism can be simplified, and the structure of the sub tank 10 including the gas-liquid separation mechanism can also be simplified, so that the manufacturing cost of the sub tank 10 can be reduced. A shape of each communicating hole is not limited to the shapes illustrated in the drawings, and various shapes can be employed.

In the cooling system 100 illustrated in FIG. 7 according to the present embodiment, the reserve tank 11 is divided into the main tank 12 and the sub tank 10, and the gas-liquid separation mechanism is provided in the sub tank 10, so that the main tank 12 can be simplified in the structure and reduced in size. At the same time, the inside of the sub tank 10 can be filled with the coolant, so that the problem of air being sucked into the liquid pump 110 can be solved.

Next, modifications of the disclosure will be described.
First Modification

Figure 6:
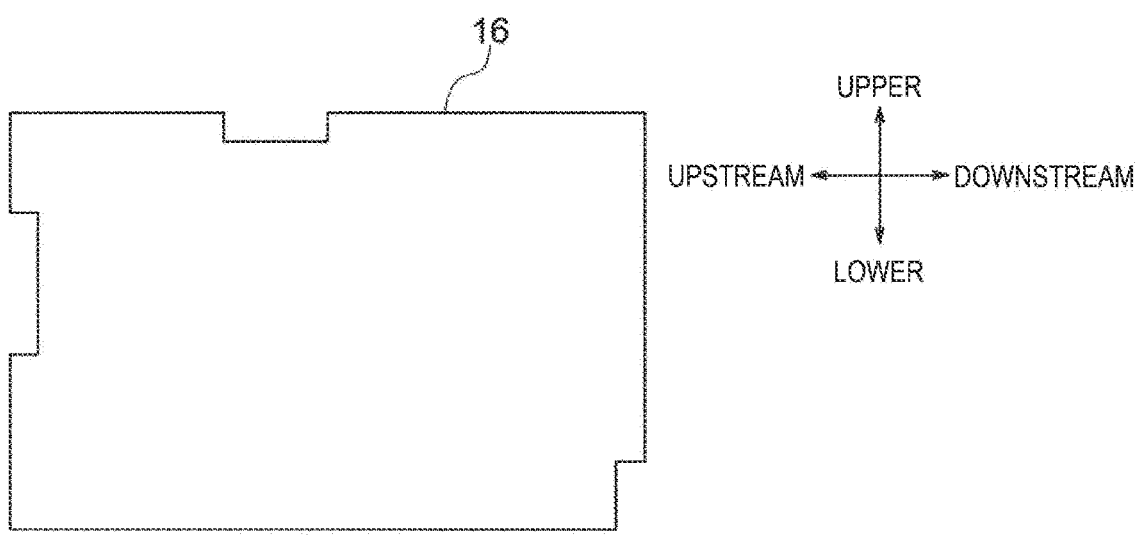
FIG. 6 is a rear view of a partition wall 16 of a reserve tank (sub tank) illustrating a modification of the embodiment.

Although the upstream communicating holes are provided at the upper and lower two positions in the above embodiment, the area of the upper upstream communicating hole 16b may be larger than the area of the downstream communicating hole 16a, and the lower upstream communicating hole 16c may be omitted as illustrated in FIG. 6.

With the upper upstream communicating hole 16b formed as described above, the flow direction of the sub flow of the coolant flowing into the second chamber from the downstream communicating hole 16a can be guided upward. The area of the upper upstream communicating hole 16b is larger than the area of the downstream communicating hole 16a, so that the flow velocity of the sub flow flowing out (returning to the first chamber) from the second chamber 19 to the first chamber 18 via the upstream communicating hole 16b can be made relatively lower than the flow velocity of the sub flow of the coolant introduced from the downstream communicating hole 16a. This is because, as described above, the product of the area of hole and the flow velocity is constant, and thus the larger the hole is, the lower the velocity of the sub flow is. Thus, the bubbles bb in the second chamber 19 is suppressed from being drawn back to the first chamber 18 to flow out of the sub tank 10. With such a configuration, the configuration of the sub tank 10 is further simplified, and the sub tank 10 is easily manufactured.

Second Modification

In the above-described embodiment, the first chamber 18 has the volume of ½ or more of the sub tank 10, and the second chamber 19 has the volume of less than ½ of the sub tank 10; however, the first chamber 18 and the second chamber 19 may have substantially the same volume.

As described above, with the first chamber 18 and the second chamber 19 having substantially the same volume, the configuration of the sub tank 10 is further simplified and the sub tank 10 is easily manufactured.

Third Modification

Although the sub tank 10 has the substantially rectangular box shape in the above embodiment, the upper wall 13D of the sub tank 10 may have a gable roof shape (triangular shape).

As described above, with the upper wall 13D of the sub tank 10 having the gable roof shape (triangular shape), the bubbles in the first chamber 18 and the second chamber 19 are more smoothly guided upward, and the bubbles BB are more easily and effectively emitted from the bubble emission port 17 (nipple 17a).

The embodiment is described above in which the disclosure is applied to the gas-liquid separation mechanism of the reserve tank 11 (sub tank 10) provided in the cooling system 100 of the vehicle; however, the disclosure is similarly applicable to a gas-liquid separation mechanism of a reserve tank provided in any cooling system other than of the vehicle.

In the above-described embodiments, the reserve tank 11 is divided into the main tank 12 and the sub tank 10, and the gas-liquid separation mechanism is provided in the sub tank 10; however, the disclosure can also be applied to a gas-liquid separation mechanism provided in a single reserve tank.

In addition, the application of the disclosure is not limited to the above-described embodiments, and various modifications can be made within the scope of aspects and the technical idea described in the description and the drawings.

According to the disclosure, a gas-liquid separation mechanism of a reserve tank that can efficiently separate bubbles contained in a coolant and collect the bubbles, with a simple configuration, is provided.

The invention claimed is:

1. A gas-liquid separation mechanism of a reserve tank, the gas-liquid separation mechanism being configured to separate gas bubbles contained in a coolant flowing into the reserve tank provided upstream of a liquid pump in a circulation path of the coolant, the reserve tank comprising:
   an inlet opening for the coolant, the inlet opening being provided at a lower portion of one of side walls opposing each other;
   an outlet opening for the coolant provided at a lower portion of another side wall of the side walls;
   a bubble emission port provided on an upper wall, the bubble emission port configured to emit the gas bubbles separated from the coolant; and
   a partition wall extending substantially parallel to a direction from the inlet opening to the outlet opening and vertically dividing the reserve tank into a first chamber and a second chamber,
   wherein the inlet opening and the outlet opening are provided in the first chamber,
   the bubble emission port is provided at least in the first chamber, and
   the partition wall comprises:
      a downstream communicating hole provided below a first end portion of the partition wall, the first end portion being proximate to the outlet opening; and
      an upstream communicating hole provided above a second end portion of the partition wall, the second end portion being proximate to the inlet opening.

2. The gas-liquid separation mechanism of the reserve tank according to claim 1, wherein an upper communicating hole is provided at a predetermined position in an upper end of the partition wall, the upper communicating hole being configured to cause the first chamber and the second chamber to communicate with each other.

3. The gas-liquid separation mechanism of the reserve tank according to claim 2, wherein the first chamber has a volume larger than a volume of the second chamber.

4. The gas-liquid separation mechanism of the reserve tank according to claim 1, wherein the upstream communicating hole is larger than the downstream communicating hole.

5. The gas-liquid separation mechanism of the reserve tank according to claim 4, wherein the first chamber has a volume larger than a volume of the second chamber.

6. The gas-liquid separation mechanism of the reserve tank according to claim 1, wherein the upstream communicating hole is provided below the first end portion in addition to above the second end portion.

7. The gas-liquid separation mechanism of the reserve tank according to claim 6, wherein the first chamber has a volume larger than a volume of the second chamber.

8. The gas-liquid separation mechanism of the reserve tank according to claim 1, wherein the first chamber has a volume larger than a volume of the second chamber.

9. The gas-liquid separation mechanism of the reserve tank according to claim 1, wherein the bubble emission port is provided to be open across both the first chamber and the second chamber.

* * * * *